3,838,335

Miller

[45] Sept. 24, 1974

[54] METHOD AND APPARATUS FOR DETERMINING THE PRESENCE OF AND DEPTH TO A HORIZONTAL ELECTRICAL RESISTIVITY CONTRAST BENEATH THE EARTH SURFACE

[75] Inventor: Dale E. Miller, Ponca City, Okla.

[73] Assignee: Continental Oil Company, Ponca, Okla.

[22] Filed: Feb. 23, 1973

[21] Appl. No.: 335,436

[52] U.S. Cl. .................................. 324/10
[51] Int. Cl. .................................. G01v 3/18
[58] Field of Search .................................. 324/1, 10

[56] References Cited
UNITED STATES PATENTS

| | | | |
|---|---|---|---|
| 2,206,892 | 7/1940 | Hawley | 324/1 |
| 2,562,992 | 8/1951 | Schlumberger | 324/10 X |
| 2,663,004 | 12/1953 | Seigel | 304/10 X |
| 2,960,651 | 11/1960 | Scotty | 324/10 X |

Primary Examiner—Gerard R. Strecker
Attorney, Agent, or Firm—William J. Miller

[57] ABSTRACT

Method and apparatus for determining the presence of and depth to a horizontal electrical resistivity contrast lying beneath the bottom of a borehole. The apparatus comprises a surface generator for applying a low frequency sinusoidal current between a long downhole current electrode unit and a distant surface current electrode. The apparatus further includes a voltage-measuring device for recording the resulting potential difference between two long downhole potential electrode units. The centers of the two long downhole potential electrode units are equally spaced several hundred feet above and below the long downhole current electrode unit, respectively. The exact spacing is chosen according to the desired depth of investigation. Another aspect of the apparatus is that the length of each downhole current and potential electrode unit is made equal to about one-tenth the chosen vertical electrode spacing. The method includes measuring the amplitude of the potential difference measured between the two long downhole potential electrode units and displaying in a log-log plot the potential difference over the low frequency sinusoidal current versus the difference of the electrode array above the bottom of the borehole and determining therefrom the distance from the bottom of the borehole to the level of electrical resistivity contrast.

8 Claims, 7 Drawing Figures

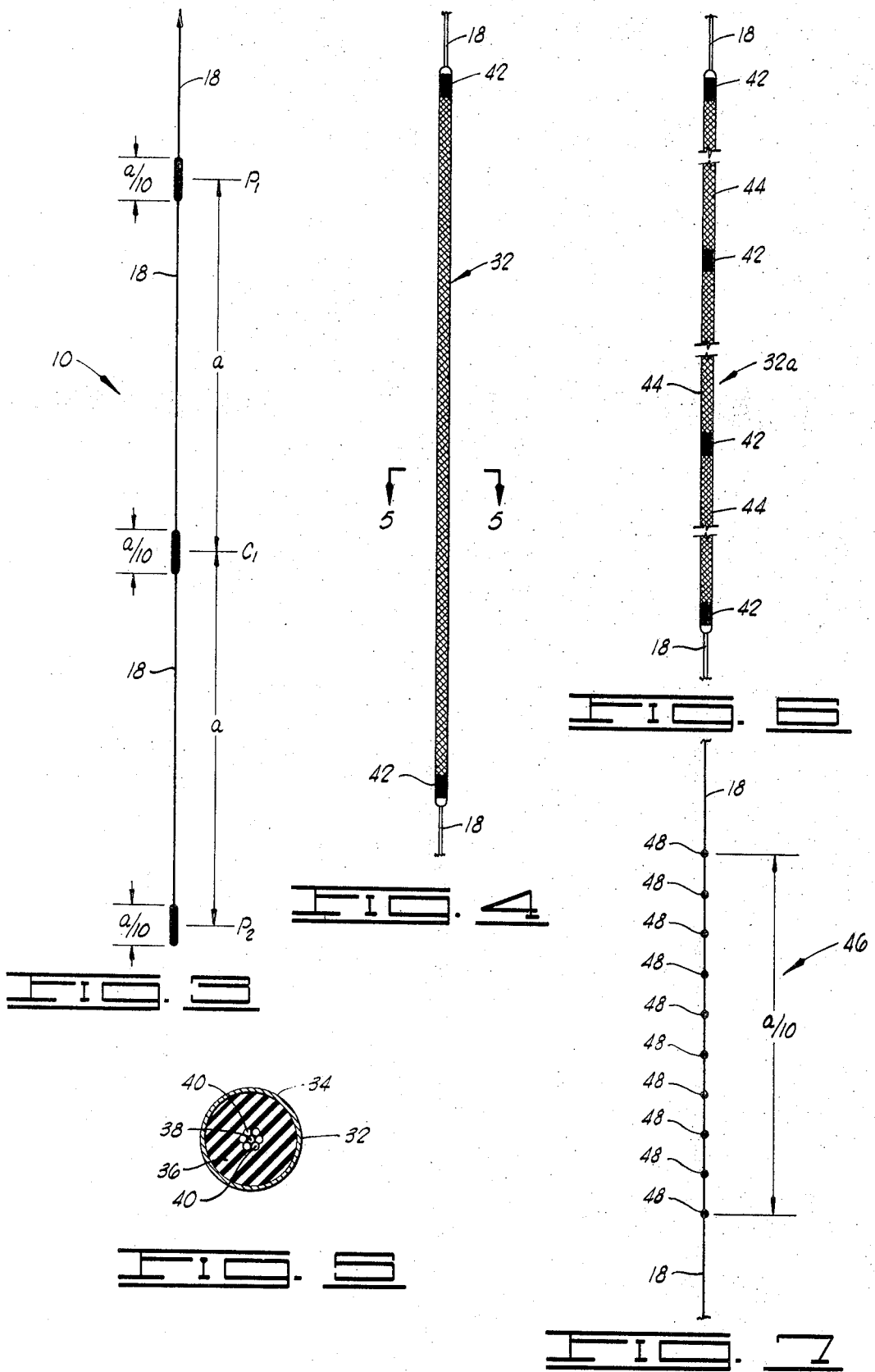

METHOD AND APPARATUS FOR DETERMINING THE PRESENCE OF AND DEPTH TO A HORIZONTAL ELECTRICAL RESISTIVITY CONTRAST BENEATH THE EARTH SURFACE

BACKGROUND OF THE INVENTION

1. Field of the Invention

The present invention relates generally to long-spaced electrical borehole logging devices and particularly to a method and electrode configuration designed for investigating horizontal resistivity contrasts lying some distance below the bottom of a borehole.

2. Description of the Prior Art

The prior art includes a number of short-spaced, high-frequency, electrical logging devices, one of which includes an electrode arrangement similar to that disclosed herein. There is also at least one long-spaced, low-frequency device shown by the prior art. It appears, however, that all of the prior art devices presently known were designed to measure the effective resistivity of the vertical cylinder of material contained between the downhole electrodes. That is, the prior art teachings are directed to various methods and apparatus for investigating the material at the level of the apparatus in the borehole rather than for investigating and providing information relating to resistivity contrasts at considerable depths below the bottom of the borehole. Furthermore, the prior art teachings are directed to apparatus utilizing essentially point electrodes which have not proved satisfactory in smoothing the response of long-spaced electric logging apparatus.

SUMMARY OF THE INVENTION

The present invention contemplates a novel method of determining the depth of a substantially horizontal electrical resistivity contrast below the bottom of a substantially vertical borehole of known depth extending downwardly from the earth surface. The method comprises the steps of: inducing a low frequency alternating current in the earth between a first position of the earth surface at a large distance from the borehole and a second position in the borehole; measuring the voltage at a third position in the borehole a fixed distance above the second position; measuring the voltage level at a fourth position in the borehole a fixed distance below the second position, said fixed distance being substantially equal to the fixed distance between the second and third positions; measuring the current between the first and second position; measuring the difference in voltage levels at the third and fourth positions; and processing the difference in voltage levels and the measured current to determine the depth of a horizontal electrical resistivity contrast.

The present invention further contemplates novel apparatus for practicing the above method to determine the depth of a horizontal resistivity contrast below the bottom of a borehole extending downwardly from the earth surface. Such apparatus includes a surface current electrode positioned on the earth surface at a relatively large distance from the borehole, and a downhole current electrode disposed within the borehole and spaced a distance above the bottom of the borehole. The apparatus further includes an upper potential electrode disposed within the borehole and spaced a distance above the downhole current electrode; and a lower potential electrode disposed within the borehole and spaced a distance below the downhole current electrode, the distance between the lower potential electrode and the downhole current electrode being substantially equal to the distance between the downhole current electrode and the upper potential electrode. The apparatus also includes means electrically connected to the upper and lower potential electrodes for continuously measuring and recording any potential difference between voltages at the upper and lower potential electrodes; means electrically connected between the surface current electrode and the downhole current electrode for applying a low frequency alternating current between the surface current electrode and the downhole current electrode; and means electrically connected between the surface current electrode and the downhole current electrode for measuring and recording current flow between the surface current electrode and the downhole current electrode.

It is, therefore, an object of the present invention to provide method and apparatus for accurately determining the depth to horizontal resistivity contrasts lying below the bottom of a borehole.

Another object of the present invention is to provide method and apparatus which will produce data yielding information about the magnitude and sign of the underlying resistivity contrasts below a borehole.

Yet another object of the present invention is to provide a downhole electrode configuration employing long electrodes to reduce the adverse effects of resistivity contrasts in individual thin formation layers intersecting the borehole in the vicinity of such electrodes.

BRIEF DESCRIPTION OF THE DRAWINGS

FIG. 3 is an enlarged schematic view of the electrode array of the present invention.

FIG. 4 is an elevational view of a typical electrode for use in the electrode array of the present invention.

FIG. 5 is a cross-sectional view taken along line 5—5 of FIG. 4.

FIG. 6 is an elevational view of a slightly modified electrode similar to that illustrated in FIG. 4.

FIG. 7 is an elevational view of an alternate electrode configuration.

DESCRIPTION OF THE PREFERRED EMBODIMENT

Figure 1:
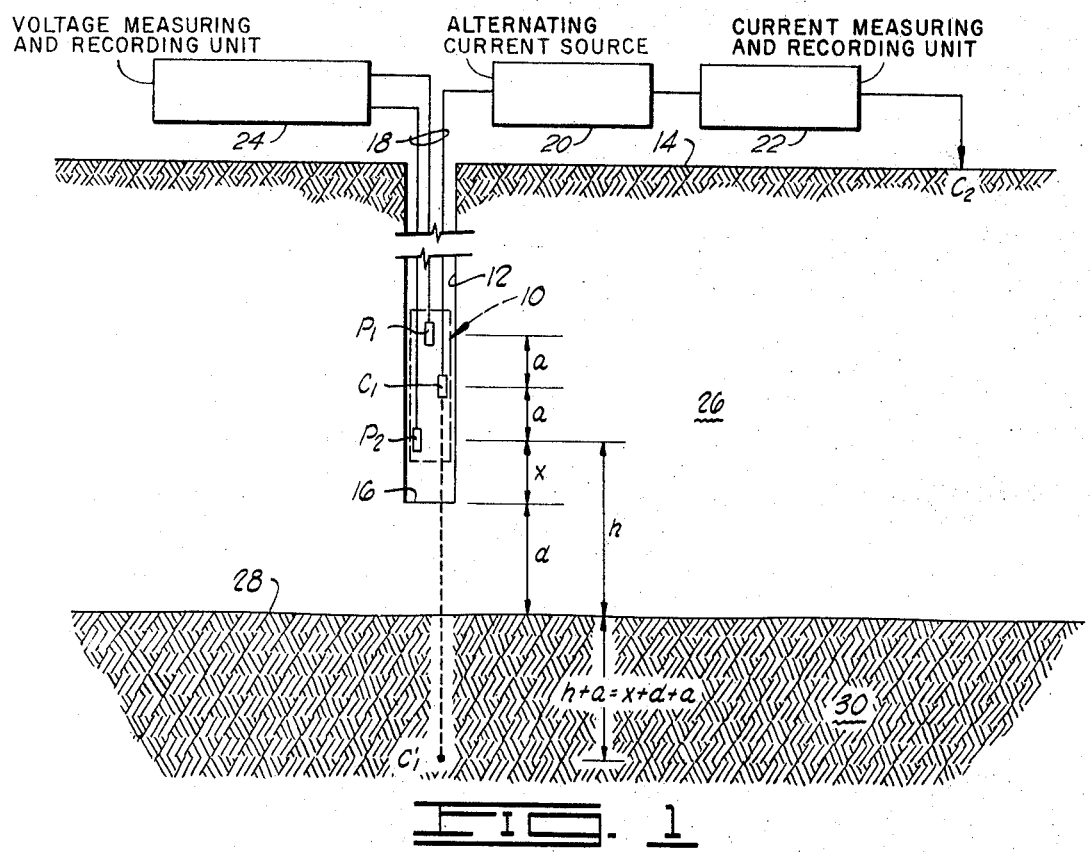
FIG. 1 is a horizontal schematic sectional view depicting the apparatus of the present invention in place in a well borehole and on the earth surface for performing an electrical well logging operation.
Figure 2:
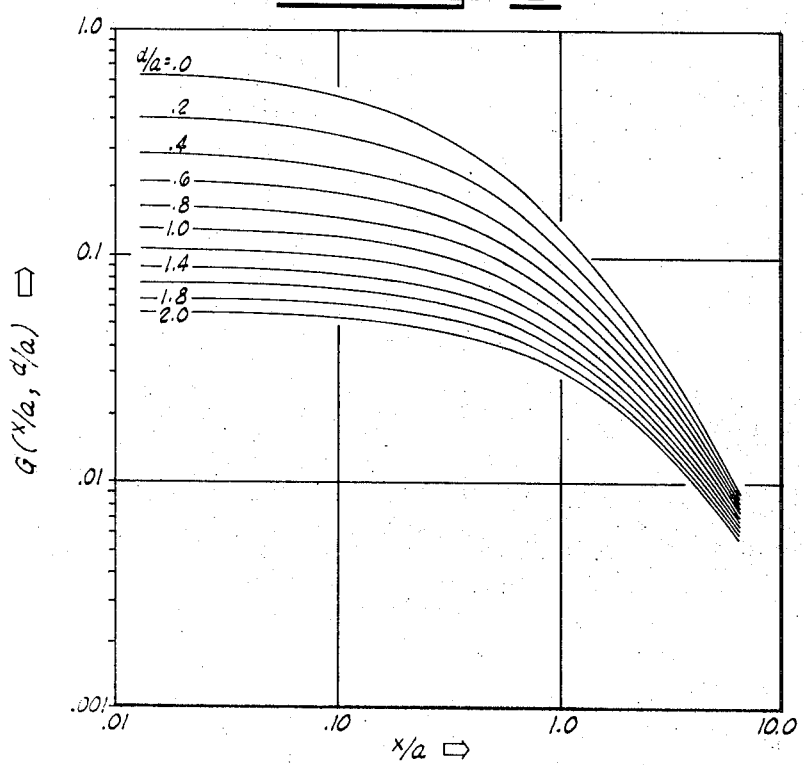
FIG. 2 is a schematic drawing illustrating a suite of curves which will assist in explaining the theory of the present invention.

Referring now to the drawings, and to FIGS. 1, 2 and 3 in particular, illustrated therein is a downhole electrode array 10 located in a well borehole 12. The borehole 12 extends vertically downward from the earth surface 14 to the bottom 16 thereof. The electrode array 10 includes a downhole current electrode $C_1$ and upper and lower potential electrodes $P_1$ and $P_2$ suitably electrically and structurally connected to a conventional well logging cable 18. A surface current electrode $C_2$ is positioned on the earth surface 14 at a relatively large distance from the borehole 12.

A source of low-frequency sinusoidal alternating current 20 and a current-measuring and recording unit 22 are electrically connected between the surface current electrode $C_2$ and the downhole current electrode $C_1$. The source of low-frequency alternating current 20 provides means for applying a sinusoidal alternating current preferably ranging from zero to five cycles per second between the electrodes $C_1$ and $C_2$. The current-measuring and recording unit 22 provides means for measuring and recording current flow between the electrodes $C_1$ and $C_2$.

A voltage-measuring and recording unit 24 is electrically connected to the upper and lower potential electrodes $P_1$ and $P_2$ for continuously measuring and recording any potential difference between voltages at the upper and lower potential electrodes $P_1$ and $P_2$. Electrical connection between the downhole electrode array 10 and the units 20, 22 and 24 is accomplished through the well logging cable 18.

GENERAL AND THEORETICAL

The electrical potential at any point P, which is a distance $r$ from a point source of current in an infinite homogeneous medium of resistivity $\rho$ is given by the formula $$U_p = (I\rho/4\pi)(1/r) \quad (1)$$

where I is the magnitude of the current.

It may be seen that when the downhole electrode array 10 is positioned within the borehole 12, as shown in FIG. 1, and is located in an infinite homogeneous medium 26, the potential at the electrodes $P_1$ and $P_2$ is $$U_{p_1} = U_{p_2} = (I\rho/4\pi)(1/a) \quad (2)$$

wherein $U_{p_1}$ is the electrical potential at the upper potential electrode $P_1$; $U_{p_2}$ is the electrical potential at the lower potential electrode $P_2$; and a is the electrode spacing between the downhole current electrode $C_1$ and the upper potential electrode $P_1$ and also the electrode spacing between the downhole current electrode $C_1$ and the lower potential electrode $P_2$.

The measured potential difference V is $$V = U_{p_1} - U_{p_2} = 0. \quad (3)$$

That is, both $P_1$ and $P_2$ are at the same potential because they are equidistant from the only effective source of current, downhole current electrode $C_1$. The surface current electrode $C_2$ is placed far enough away from the electrode array 10 that its contribution to the potential difference V is negligible.

Assume that there is a resistivity contrast along some horizontal interface 28 below the electrode array. It is well known that the effect of this interface 28 on a potential field in the upper medium 26 can be computed as though there were another current source $C'_1$ located at the mirror image point of $C_1$ below the interface. The image current $I'$ equals $kI$, where $k$ is the resistivity reflection factor given by $$k = (\rho_2 - \rho_1)/(\rho_2 + \rho_1) \quad (4)$$

where $\rho_1$ is the resistivity of the infinite homogeneous medium 26 above the interface and $\rho_2$ is the resistivity of the medium 30 below the interface.

The potential electrodes, $P_1$ and $P_2$, are not equidistant from the image source $C_1'$ and, therefore, the interface causes a small potential difference between $P_1$ and $P_2$. The fact that the potential difference is zero when there is no interface greatly increases the sensitivity of the electrode array 10 of the present invention to the small potential difference caused by the resistivity contrast at some horizontal interface.

Referring to FIG. 1, the total potentials at $P_1$ and $P_2$ resulting from downhole current electrode $C_1$ and its image $C_1'$ are given by the equations $$U_{p_1} = I\rho_1/4\pi \, (1/a + k/2h + 3a)$$
$$U_{p_2} = I\rho_1/4\pi \, (1/a + k/2h + a) \quad (5)$$

where $h$ is the vertical distance between the lower potential electrode $P_2$ and the interface 28, and the potential difference is given by $$V = U_{p_2} - U_{p_1} = I\rho_1 k/4\pi \, 1/(2h+a) - 1/(2h+3a) \quad (6)$$

Substituting $h = x + d$, where $x$ is the vertical distance between the lower potential electrode $P_2$ and the bottom of the borehole 16, and $d$ is the vertical distance between the bottom of the borehole 16 and the interface 28, gives $$V = I\rho_1 k/4\pi \, [1/2(x+d)+a - 1/2(x+d)+3a] \quad (7)$$

Rewriting Equation (7) in terms of dimensionless parameters, $x/a$ and $d/a$, gives $$V = I\rho_1 k/4\pi a \, [1/2\,x/a + 2\,d/a + 1 - 1/2\,x/a + 2\,d/a + 3] \quad (8)$$

or $$V = (I\rho_1 k/4\pi a) \, G(x/a, d/a) \quad (9)$$

where $$G(x/a, d/a) = 1/(2\,x/a + 2\,d/a + 1) - 1/(2\,x/a + 2\,d/a + 3) \quad (10)$$

The effect of variations in the current I obtained for different positions of the electrode array 10 in the borehole 12 can be eliminated by using the ratio $V/I$ as is done in surface resistivity work. Thus we have $$V/I = \rho_1 k/4\pi a \, G(x/a, d/a) \quad (11)$$

Taking the log of both sides gives $$\log V/I = \log[\rho_1 k/4\pi a] + \log G(x/a, d/a) \quad (12)$$

Equation 12 is the key to the use of the electrode array 10 of the present invention. For a given logging problem $\rho_1$, $k$, and $a$ are constants. Thus, the first term on the right of Equation 12 is a constant, which means that a plot of $\log V/I$ vs. $\log x/a$, for a given value of $d/a$, will have exactly the same shape as a plot of $\log G(x/a, d/a)$ vs. $\log x/a$ for the same value of $d/a$.

FIG. 2 illustrates a suite of theoretical curves of log G vs. log ($x/a$) for different values of $d/a$ ranging from 0 to 2 in steps of 0.2. By matching the experimentally determined curve of log $V/I$ vs. log $x/a$ with one of the curves in FIG. 2, the value of $d/a$ can be determined. Furthermore, once $d/a$ is known, the value of the constant term, $\log(\rho_1 k)/(4\pi a)$ can be determined from Equation 12. Since a is known and $\rho_1$ can be obtained from conventional electric logs, the value of $k$ can be computed. Then $\rho_2$ can be computed from Equation 4.

In the preceding discussion, it was assumed that $\rho_2 > \rho_1$. If $\rho_2 < \rho_1$, $k$ would be negative and the measured $V$ would be 180° out of phase with the input alternating current I, but the plot of log $V/I$ vs. log $x/a$ would not be affected.

OPERATION OF THE PREFERRED EMBODIMENT

As an example of a relatively small signal available in use of the electrode array 10 of the present invention, assume the electrode spacing a is 500 feet and the interface 28 is located 1,000 feet below the bottom of the borehead 16, that is, $d/a = 2$. Assume further that the lower potential electrode $P_2$ is 1,600 feet above the bottom of the borehole 16, then $x/a = 3.2$. From the lowermost curve shown in FIG. 2, the value of $G(x/a = 3.2, d/a = 2.0)$ is 0.0131. Furthermore, assume $\rho_1 = 10$ ohm-ft. (about 3 ohm-m) and $\rho_2 = 100$ ohm-ft. (about 30 ohm-m) thus giving a value of $k$ about 0.9. Then for an input current of 5 amps rms, Equation 9 gives an rms signal voltage of $V = I\rho_1 k/4\pi a \; G\;(x/a, d/a) = 5 \times 10 \times 0.9/4\pi \times 500 \; (0.0131)$ $V = 93$ microvolts.

If the electrode array 10 of the present invention were lowered to the bottom of the hole 16, it may be readily calculated that the signal voltage would increase to about 410 microvolts.

As noted above, the object of a survey performed by practicing the method and utilizing the apparatus described above is to determine the presence of and the depth to major horizontal resistivity contrasts lying beneath the bottom of a borehole. Consequently, the electrical effects of any individual thin formation layers which intersect the borehole in the vicinity of the electrodes represent noise in the data obtained while practicing the method of the present invention. A novel aspect of the present invention is the use of long electrodes to reduce or smooth the effects of the individual thin formation layers in the vicinity of the electrodes, as opposed to known conventional logging systems which employ virtually point electrodes in order to resolve the thin layers.

Besides the advantage of smoothing out the effects of the individual thin formation layers, long electrodes provide a much greater area of electrical contact than conventioanl point electrodes. The resulting reduction in electrode contact resistance means that a given source of voltage will give a larger signal voltage.

The present invention contemplates an effective electrode length preferably equal to one-tenth of the electrode spacing $a$. See FIG. 3. It can be shown theoretically that at a distance along the axis of the electrode array 10 and the logging cable 18 equal to 10 times the electrode length, the measured potential of such a long electrode is only about one percent larger than it would be for a point electrode located at the center of such a long electrode.

DESCRIPTION OF THE EMBODIMENT OF FIGS. 4 AND 5

A first preferred form for the long electrodes $C_1$, $P_1$ and $P_2$ is illustrated in FIGS. 4 and 5 and is generally designated by the reference character 32. The electrode 32 is constructed of a braided mesh 34 formed of corrosion-resistant wire surrounding a flexible dielectric core 36, such as rubber, through which run a flexible longitudinal strength member 38 and a plurality of flexible signal conductors 40 for the lower electrodes. The mesh is connected to one of the conductors in the logging cable 18 by suitable connecting means. An electrode constructed in this manner has the advantage of being flexible enough to be wound up on a logging cable drum (not shown) along with the logging cable to which it is connected. The electrode section 32 is joined to the logging cable 18 by standard logging cable connectors 42 at top and bottom. The desired electrode spacing is obtained by inserting the proper lengths of logging cable 18 between the electrode sections 32.

DESCRIPTION OF THE EMBODIMENT OF FIG. 6

FIG. 6 illustrates a slight modification of the previously described braided mesh electrode 32 which permits the changing of the length of the electrode to provide compatibility with different electrode spacings in the electrode array. The modified electrode 32a is made up of individual sections 44, preferably in lengths of 10 feet, with standard cable connectors 42 at each end thereof. The wire mesh 34 covering each section 44 is connected to the proper internal conductor 40 in the section such that all the physically connected sections of each electrode 32 are also properly electrically connected.

DESCRIPTION OF THE EMBODIMENT OF FIG. 7

An alternate form for the long electrode $C_1$, $P_1$ and $P_2$ is illustrated in FIG. 7 and is designated by the reference character 46. It comprises a string of conventional point electrodes 48 spaced five to ten feet apart along the logging cable 18 and connected electrically as well as physically. As noted above, each electrode 46 would preferably have a length of $a/10$ when used in the electrode array 10 of the present invention. An advantage of this alternate configuration 46 is that the effective electrode length can be changed conveniently by merely electrically connecting or disconnecting individual point electrode units 48 without physically dismantling the electrode array 10.

From the above detailed description of the various aspects of the method and apparatus of the present invention, it will be readily apparent to those skilled in the art that a novel and useful method has been disclosed for determining the presence of and the depth to a horizontal electrical resistivity contrast lying below the bottom of a borehole utilizing electrical logging techniques. The method and apparatus of the present invention readily attains the objects set forth above.

Although a preferred method and apparatus has been described in detail, it is to be understood that various changes, substitutions and alterations can be made in the specific steps and structure described without departing from the spirit and scope of the invention as defined in the following claims.

What is claimed is:

1. A method of determining the depth of a substantially horizontal electrical resistivity contrast below the bottom of a substantially vertical borehole of known depth extending downwardly from the earth surface, comprising the steps of:

inducing a low frequency alternating current in the earth between a first position on the earth surface at a large distance from the borehole and a second position in the borehole a known distance above the bottom of said borehole and a greater distance above the resistivity contrast the depth of which is to be determined;

measuring the voltage level at a third position in the borehole a fixed distance above the second position;

measuring the voltage level at a fourth position in the borehole a fixed distance below the second position, said fixed distance being substantially equal to the fixed distance between the second and third positions;

measuring the current between the first and second positions;

measuring the difference in voltage levels at the third and fourth positions; and processing the difference in the measured voltage levels and the measured current to determine the depth of the horizontal electrical resistivity contrast below the bottom of said borehole.

2. The method as defined in claim 1 wherein the frequency of the alternating current induced in the earth is within the range from zero to five cycles per second.

3. The method as defined in claim 1 wherein the alternating current induced in the earth is sinusoidal.

4. The method as defined in claim 3 wherein the frequency of the sinusoidal alternating current is within the range from zero to five cycles per second.

5. The method as defined in claim 4 wherein the fourth position is located a distance "$x$" above the bottom of the borehole, the second position is located a distance "$a$" above the fourth position, and the third position is the same distance "$a$" above the second position, and wherein the step of processing the difference in voltage levels and the measured current comprises the additional step of:

converting the difference in voltage levels and the measured current by approximating a solution to the equation;

$$\log V/I = \log[\rho_1 k/4\pi a] + \log[1/(2\,x/a + 2\,d/a + 1) - 1/(2\,x/a + 2\,d/a + 3)].$$

where "$\rho_1$" is the resistivity of an infinite homogeneous medium, "$k$" is a constant resistivity reflection factor, and "$d$" is the vertical distance from the bottom of the borehole to a substantially horizontal resistivity contrast therebelow.

6. The method as defined in claim 5 characterized further to include the additional step of:

recording $\log V/I$ and $\log x/a$; and plotting $\log V/I$ vs. $\log x/a$.

7. Apparatus for determining the depth of a horizontal resistivity contrast below the bottom of a borehole of known depth extending downwardly from the earth surface, comprising:

a surface current electrode positioned on the earth surface at a relatively large distance from the borehole;

a downhole current electrode disposed within the borehole and spaced a known distance above the bottom of the borehole and a greater distance above the resistivity contrast the depth of which is to be determined;

an upper potential electrode disposed within the borehole and spaced a distance above the downhole current electrode;

a lower potential electrode disposed within the borehole and spaced a distance below the downhole current electrode, the distance between the lower potential electrode and the downhole current electrode being substantially equal to the distance between the downhole current electrode and the upper potential electrode;

the effective lengths of said upper and lower potential electrodes each being equal to approximately one tenth the distance said upper and lower potential electrodes are spaced, respectively, above and below said downhole electrode;

means electrically connected to the upper and lower potential electrodes for continuously measuring and recording any potential difference between voltages at the upper and lower potential electrodes;

means electrically connected between the surface current electrode and the downhole current electrode for applying a low frequency alternating current between the surface current electrode and the downhole current electrode; and means electrically connected between the surface current electrode and the downhole current electrode for measuring and recording current flow between the surface current electrode and the downhole current electrode.

8. Apparatus for determining the depth of a horizontal electrical resistivity contrast below the bottom of a borehole of known depth extending downwardly from the earth surface, comprising:

a surface current electrode positioned on the earth surface a large distance from the borehole;

a lower potential electrode disposed within the borehole a distance "$x$" above the bottom of the borehole and a distance greater than "$x$" above the resistivity contrast the depth of which is to be determined;

a downhole current electrode disposed within the borehole a distance "$a$" above the lower downhole potential electrode and a distance greater than the total distance "$x$" plus "$a$" above the resistivity contrast the depth of which is to be determined;

an upper potential electrode disposed within the borehole a distance "$a$" above the downhole current electrode;

the effective lengths of said upper and lower potential electrodes each being equal to approximately one tenth the distance "$a$";

means connected to the upper and lower potential electrodes for continuously receiving, measuring and recording any potential difference between voltages at the upper and lower potential electrodes; means electrically connected between the surface current electrode and the downhole current electrode for applying a low frequency sinusoidal alternating current between the surface current electrode and the downhole current electrode; and means electrically connected between the surface current electrode and the downhole current electrode for receiving, measuring and recording the current flow between the surface current electrode and the downhole current electrode.

* * * * *